US 10,486,839 B2

(12) United States Patent
Kogure et al.

(10) Patent No.: US 10,486,839 B2
(45) Date of Patent: Nov. 26, 2019

(54) FILL PACKAGING MACHINE

(71) Applicant: TAISEI LAMICK CO., LTD., Saitama (JP)

(72) Inventors: Hidenori Kogure, Saitama (JP); Toshiaki Shida, Saitama (JP)

(73) Assignee: TAISEI LAMICK CO., LTD., Saitama (JP)

( * ) Notice: Subject to any disclaimer, the term of this patent is extended or adjusted under 35 U.S.C. 154(b) by 292 days.

(21) Appl. No.: 15/512,879

(22) PCT Filed: Oct. 1, 2015

(86) PCT No.: PCT/JP2015/077894
§ 371 (c)(1),
(2) Date: Mar. 21, 2017

(87) PCT Pub. No.: WO2016/052689
PCT Pub. Date: Apr. 7, 2016

(65) Prior Publication Data
US 2017/0297752 A1    Oct. 19, 2017

(30) Foreign Application Priority Data
Oct. 2, 2014    (JP) .................................. 2014-203563

(51) Int. Cl.
*B65B 9/087*    (2012.01)
*B65B 1/26*    (2006.01)
(Continued)

(52) U.S. Cl.
CPC ............ *B65B 9/087* (2013.01); *B29C 66/133* (2013.01); *B29C 66/3452* (2013.01);
(Continued)

(58) Field of Classification Search
CPC . B29L 2031/7128; B65B 9/20; B65B 9/2014; B65B 9/2021; B65B 9/2028;
(Continued)

(56) References Cited

U.S. PATENT DOCUMENTS 3,001,572 A * 9/1961 Young .................... B29C 59/02
101/31
4,949,846 A * 8/1990 Lakey .................... B29C 65/18
156/251

(Continued)

FOREIGN PATENT DOCUMENTS

| JP | 58-149204 | 9/1983 |
| JP | 10-119931 | 5/1998 |

(Continued)

OTHER PUBLICATIONS

Office Action issued in Republic of Korea Counterpart Patent Appl. No. 10-2017-7009752, dated Oct. 23, 2018.

(Continued)

*Primary Examiner* — Hemant Desai
*Assistant Examiner* — Amelia Jae-Ippel Vorce
(74) *Attorney, Agent, or Firm* — Greenblum & Bernstein, P.L.C.

(57) ABSTRACT

A fill packaging machine includes a vertical sealing means for folding a packaging film at its central part and continuously forming a vertical sealed portion at its side edge part to shape into a cylinder, and a lateral sealing means for forming lateral sealed portions in a direction perpendicular to the longitudinal direction of the packaging film. An easy separable sealed portion is continuously formed in the side edge part of the packaging film by the first vertical sealed portion forming section, and a vertical sealed portion having a partial non-sealed portion of a bottle mouth type is formed on the easy separable sealed portion by the second vertical (Continued)

sealed portion forming section. The first vertical sealed portion forming section is a pair of heat sealing rolls or heat sealing plates, a surface of at least one of which is made from an elastic material softer than a metal.

12 Claims, 6 Drawing Sheets

(51) Int. Cl.
    *B29C 65/00*     (2006.01)
    *B65B 61/18*     (2006.01)
    *B65B 9/20*     (2012.01)
    *B65B 9/22*     (2006.01)
    *B65B 61/06*     (2006.01)
    *B65B 51/26*     (2006.01)
    *B29L 31/00*     (2006.01)
    *B65B 57/06*     (2006.01)

(52) U.S. Cl.
    CPC .... *B29C 66/4322* (2013.01); *B29C 66/43129* (2013.01); *B29C 66/8122* (2013.01); *B29C 66/81431* (2013.01); *B29C 66/81457* (2013.01); *B29C 66/81465* (2013.01); *B29C 66/83413* (2013.01); *B29C 66/849* (2013.01); *B29C 66/91216* (2013.01); *B29C 66/91231* (2013.01); *B29C 66/91423* (2013.01); *B65B 9/20* (2013.01); *B65B 9/22* (2013.01); *B65B 51/26* (2013.01); *B65B 61/06* (2013.01); *B65B 61/18* (2013.01); *B29C 66/1122* (2013.01); *B29C 66/4312* (2013.01); *B29C 66/81422* (2013.01); *B29C 66/81435* (2013.01); *B29C 66/83513* (2013.01); *B29L 2031/7128* (2013.01); *B65B 57/06* (2013.01)

(58) Field of Classification Search
    CPC ......... B65B 9/2042; B65B 9/207; B65B 9/12; B65B 51/16; B65B 51/26; B65B 51/10; B29C 66/849; B29C 66/8491; B29C 66/3452; B29C 66/41
    See application file for complete search history.

(56) References Cited

U.S. PATENT DOCUMENTS

| | | | | |
|---|---|---|---|---|
| 6,178,726 B1* | 1/2001 | Takigawa | ................ | B29C 65/18 53/451 |
| 6,332,305 B1* | 12/2001 | Takahashi | ............... | B29C 65/18 53/551 |
| 6,374,572 B1* | 4/2002 | Honma | ................... | B29C 65/02 53/55 |
| 8,607,537 B2* | 12/2013 | Hatsuno | ................ | B29C 66/244 53/548 |
| 8,709,579 B2* | 4/2014 | Hoenigmann | ........ | B32B 37/144 428/156 |
| 2002/0104292 A1* | 8/2002 | Tsuruta | ................... | B29C 65/02 53/451 |
| 2006/0021300 A1* | 2/2006 | Tada | ....................... | B29C 65/18 53/551 |
| 2006/0236659 A1* | 10/2006 | Miyazawa | ............ | B65B 9/2021 53/451 |
| 2008/0115458 A1* | 5/2008 | Funaki | .................. | B65B 51/303 53/373.7 |
| 2010/0115894 A1* | 5/2010 | Miyamoto | .............. | B29C 65/18 53/567 |
| 2010/0262273 A1* | 10/2010 | Dose | ....................... | B29C 65/08 700/122 |
| 2012/0204515 A1* | 8/2012 | Miyamoto | ................ | B65B 1/22 53/266.1 |
| 2015/0016757 A1* | 1/2015 | Kogure | ............. | B65D 75/5855 383/210 |
| 2015/0314896 A1* | 11/2015 | Zeuschner | ............. | B65B 57/00 426/389 |
| 2017/0247130 A1* | 8/2017 | Hosaka | ................... | B65B 51/10 |
| 2017/0253358 A1* | 9/2017 | Kogure | ................... | B29C 65/08 |

FOREIGN PATENT DOCUMENTS

| | | | | |
|---|---|---|---|---|
| JP | 11-227796 | | 8/1999 | |
| JP | 2000-85708 | | 3/2000 | |
| JP | 2000-203530 | | 7/2000 | |
| JP | 2003-175914 | | 6/2003 | |
| JP | 2005-138844 | | 6/2005 | |
| JP | 2006-123974 | | 5/2006 | |
| JP | 2007-99337 | | 4/2007 | |
| JP | 2008-273539 | | 11/2008 | |
| JP | 4701058 B2 * | | 6/2011 | ............ B29C 65/02 |
| JP | 2011-136773 | | 7/2011 | |
| JP | 2013-169991 | | 9/2013 | |
| JP | 2014-58338 | | 4/2014 | |

OTHER PUBLICATIONS

U.S. Appl. No. 15/507,021 to Hosaka et al., filed Feb. 27, 2017.
Search Report issued in International Bureau of WIPO Patent Application No. PCT/JP2015/077894, dated Dec. 22, 2015.

* cited by examiner back-lining joint part side

FILL PACKAGING MACHINE

TECHNICAL FIELD

This invention relates to a fill packaging machine for manufacturing a package body provided on its vertical sealed portion with a pouring pathway sealed at an easy-separable state.

RELATED ART

A soft packaging film is shaped in the form of a bag and a packing material of liquid, viscous fluid, powder, granulates or others such as drink and food, seasonings, medicines, cosmetics or the like is fill packaged therein to form a package bag, which is widely used. In order to easily take out the packing material from such a package bag, Patent Document 1 discloses a package bag provided on its pouring port part with an easily separable sealed opening portion.

Also, Patent Document 2 filed by the applicant proposes a package bag capable of pouring the packing material wherein an easy separable sealed pathway for pouring the packing material is disposed in a butt-seamed back-lining joint part and a fill space of the packing material is pushed at a state of folding the back-lining joint part at its center to open the easy separable sealed pathway under a small pushing force simply.

As a method of forming the easy separable sealed part in such a package bag are proposed, for example, a method wherein a surface of a sealant layer in a packaging film is subjected to a plasma irradiating treatment to improve wettability of the surface and suppress fusion of the packaging film (Patent Document 3), a method of forming an ink coating layer in a heat sealed face of the packaging film and so on.

PRIOR ART DOCUMENTS

Patent Documents

Patent Document 1: JP-A-H11-227796
Patent Document 2: JP-A-2013-169991
Patent Document 3: JP-A-2014-058338

SUMMARY OF THE INVENTION

Task to be Solved by the Invention

In the method of Patent Document 3, however, there are problems that an instrument required for plasma irradiation is expensive and scattering is caused in the plasma irradiating treatment. In the method of forming the ink coating layer, there is a fear that the ink is incorporated into the packing material, which cannot be particularly utilized when the packing material is drink and food.

In the package bag disclosed in Patent Document 2, it is necessary that the easy separable part is accurately formed in only the pouring pathway disposed in the back-lining joint part. However, the accuracy is low in all of the conventional techniques, so that the easy separable treatment is performed up to the other portion and it is difficult to control strength in the easy separable part and hence there is a fear that the bag is broken from the easy separable part to cause liquid leakage or the like. Particularly, it cannot be applied to a fill packaging machine for performing high-speed fill packaging.

Also, if it is intended to manufacture the package bag of Patent Document 2 by the conventional three-way or four-way sealing type fill packaging machine, lateral sealing is performed at a state of tipping the back-lining joint part to one side, but there is a thickness difference between the back-lining joint part (four packaging films) and the other part (two packaging films), so that fusion joining cannot be performed uniformly and only the back-lining joint part having a large thickness is fused and hence there are problems that liquid leakage is caused in the other portion, and strong pushing force is required for mitigating the thickness difference and so on.

It is, therefore an object of the invention to provide a fill packaging machine capable of accurately forming an easy separable sealed portion in only a pouring pathway disposed in the vertical sealed portion without requiring the use of expensive instrument. Furthermore, it is to provide a fill packaging machine with a lateral sealing means capable of uniformly joining lateral sealed portions at upper side and lower side of a package bag in order to manufacture a package body having a back-lining joint part as a vertical sealed portion as shown in Patent Document 2.

Solution for Task

In studies for attaining the above objects, the inventors have found out that when a fill packaging machine is provided with a vertical sealing means for folding a packaging film run out from an original fabric roll at its central part so as to face adhesive layers or sealant layers to each other and continuously forming a vertical sealed portion at its side edge part in a longitudinal direction of the packaging film to shape into a cylinder and a lateral sealing means for forming lateral sealed portions, each of which being extended over a full width of the packaging film in a direction perpendicular to the longitudinal direction of the packaging film, at given intervals in the longitudinal direction of the packaging film while filling a liquid packing material into the cylindrically formed packaging film in order to manufacture a package body with a pouring pathway at an easy separable state on the vertical sealed portion, it is effective that the vertical sealing means has a first vertical sealed portion forming section and a second vertical sealed portion forming section, and an easy separable sealed portion is continuously formed in the side edge part of the packaging film by the first vertical sealed portion forming section, and a vertical sealed portion having a partial non-sealed portion of a bottle mouth type is formed on the easy separable sealed portion by the second vertical sealed portion forming section, and the first vertical sealed portion forming section is a pair of heat sealing rolls or heat sealing plates, a surface of at least one of which is made from an elastic material softer than a metal, and as a result the invention has been accomplished.

Moreover, the following constructions are preferable solving means in the fill packaging machine according to the invention.

(1) the first vertical sealed portion forming section is a pair of heat sealing rolls or heat sealing plates, one of which is made from an elastic material softer than a metal and the other is made from a metallic material, a surface of the heat sealing roll or heat sealing plate made from the metallic material is subjected to polishing, blasting or piercing;

(2) the second vertical sealed portion forming section is made of a pair of heat sealing rolls or heat sealing plates provided with heat sealing bars of a bottle mouth type and a third vertical sealed portion forming section for heat sealing a portion between the sealed portions formed by the second vertical sealed portion forming section is located posterior to the second vertical sealed portion forming section;

(3) the vertical sealing means is a back-lining joint part, while the lateral sealing means is provided with a first lateral sealed portion forming section and a second lateral sealed portion forming section, and at least one of the first lateral sealed portion forming section and the second lateral sealed portion forming section is a pair of heat sealing rolls or heat sealing plates, a surface of which at least facing to the back-lining joint part is made from an elastic material softer than a metal;

(4) at least one of the first lateral sealed portion forming section and the second lateral sealed portion forming section is a pair of heat sealing rolls or heat sealing plates, one of which is made from an elastic material softer than a metal and the other is made from a metallic material, a surface of the heat sealing roll or heat sealing plate made from the metallic material is subjected to grooving extending in a direction perpendicular to the running direction of the packaging film; and (5) the elastic material softer than the metal has a laminate structure of two or more layers.

Effect of the Invention

According to the fill packaging machine of the invention, the easy separable sealing portion is formed in the overlapped side edge parts of the packaging film by the first vertical sealed portion forming section, and thereafter the pouring pathway can be formed on the vertical sealed portion by sealing the easy separable sealing portion at a high strength by the second vertical sealed portion forming section so as to leave a pouring pathway of a bottle mouth type, while only the inside of the pouring pathway can be made at an easy separable sealing state.

In the invention, the first vertical sealed portion forming section is a pair of heat sealing rolls or heat sealing plates and the surface in either one or both of the pair of heat sealing rolls or heat sealing plates is made from an elastic material softer than a metal, so that an interleaving force (pushing force) to the packaging film can be made smaller and the easy separable sealed portion can be formed simply and stably by adjusting a clearance and a temperature between the heat sealing rolls or heat sealing plates.

When the first vertical sealed portion forming section is the pair of heat sealing rolls or heat sealing plates, the surface of one of which being made from the elastic material softer than a metal and the other being made from a metallic material, it is preferable that the surface of the heat sealing roll or heat sealing plate made from the metallic material is subjected to polishing, blasting or piercing, whereby an area contacting with the packaging film can be made small and the pushing force and heat conduction to the packaging film can be made weak and hence the easy separable sealed portion can be formed more stably.

In the invention, the second vertical sealed portion forming section is a vertical sealing means for forming the pouring pathway of a bottle mouth type and the third vertical sealed portion forming section is located posterior thereto to heat seal a region between the vertical sealed portions formed by the second vertical sealed portion forming section, so that the length of the vertical sealed portion can be changed properly in accordance with a longitudinal length of a product to be manufactured (product pitch), and hence it is not necessary to replace the apparatus in accordance with the product pitch and various products having a different product pitch can be manufactured with the same apparatus.

According to the invention, when the vertical sealed portion is a back-lining joint part, the lateral sealing means is constructed with the first lateral sealed portion forming section and the second lateral sealed portion forming section, and at least one of the first lateral sealed portion forming section and the second lateral sealed portion forming section is constituted with the pair of heat sealing rolls or heat sealing plates, at least a surface facing to the back-lining joint part being made from an elastic material softer than a metal, so that a difference of thickness between the back-lining joint part (four packaging films) and the other portion (two packaging film) is mitigated by embedding the back-lining joint part into the elastic material in the lateral sealing and hence the lateral sealed portions in upper side and lower side of the package bag can be fusion-joined uniformly and rigidly by the lateral sealing means.

At least one of the first lateral sealed portion forming section and the second lateral sealed portion forming section is constructed with a pair of heat sealing rolls or heat sealing plates, a surface of one of which being made from an elastic material softer than a metal and the other being made from a metallic material, and the surface of the heat sealing roll or heat sealing plate made from the metallic material is subjected to grooving extended in a direction perpendicular to the running direction of the packaging film, whereby the packing material and bubbles bitten into the lateral sealed portion can be pushed out therefrom, while a line pressure in a convex edge part can be increased by rise of surface pressure to tightly fuse upper and lower end parts of the lateral sealed portion overlapped with the vertical sealed portion.

Moreover, when the elastic material softer than the metal is constituted with a lamination structure of two or more base material and coating material, the deformation, wearing and the like of the base material can be suppressed by the coating material, so that various base materials can be used, while the heat sealing rolls or heat sealing plates can be used over a long period of time.

BRIEF DESCRIPTION OF THE DRAWINGS

FIG. 1 is a schematic view illustrating a construction of a vertical type fill packaging machine as an embodiment of the fill packaging machine according to the invention. In the vertical type fill packaging machine of FIG. 1, an elongated packaging film of a laminate structure formed by laminating a base film layer made of biaxially oriented nylon film, polyethylene terephthalate film or the like and a sealant layer made from various polyethylene resins or the like is folded in the widthwise direction so as to face the sealant layers to each other while continuously running in its longitudinal direction and both folded side edge parts are overlapped with each other to continuously manufacture many package bags made from the packaging film, while a fluid packing material of liquid, viscous, jelly or others such as drink and food, seasonings, medicines, cosmetics or the like is automatically filled into each of the package bags.

Figure 1:
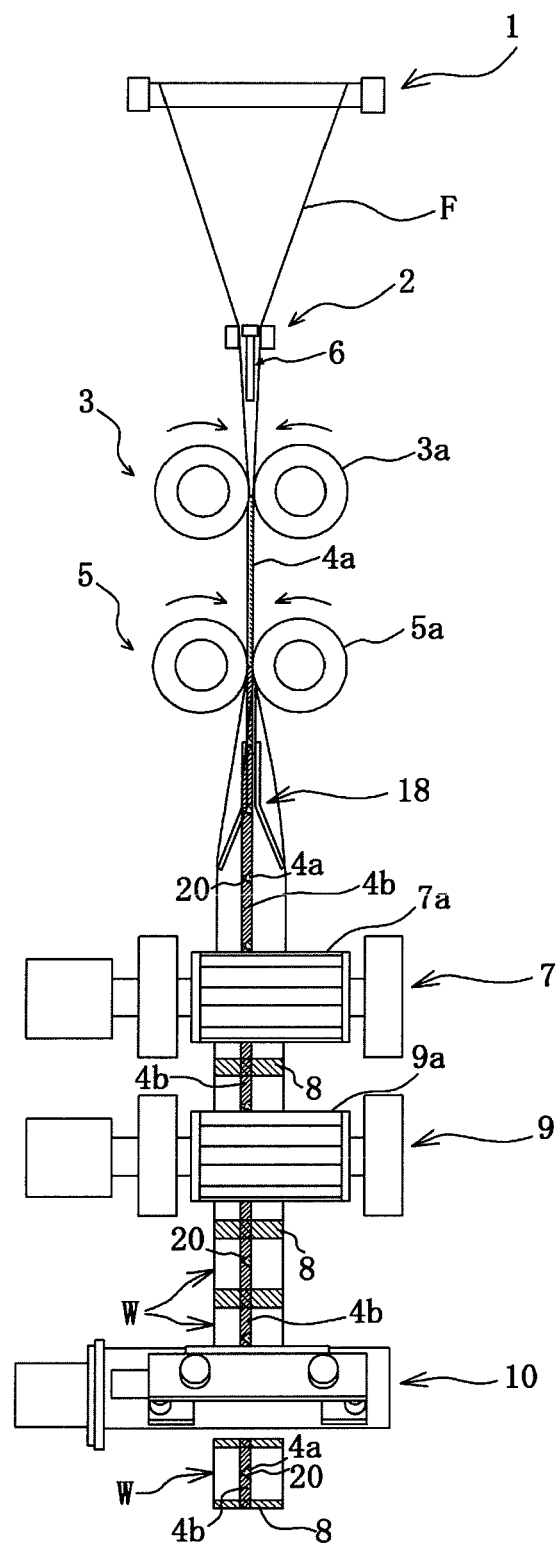
FIG. 1 is a schematic view illustrating a construction of a vertical type fill packaging machine as an embodiment of the fill packaging machine according to the invention.

In the fill packaging machine shown in FIG. 1, an elongated packaging film F continuously run out from a film roll (not shown) is continuously run from top down through a film guiding section 1, during which the packaging film F is folded in the widthwise direction so as to face sealant layers to each other while being guided with a film folding section 2 made of U-shaped and inverted L-shaped (upper side) guide rods and the both folded side edge parts of the packaging film F are overlapped with each other.

In a first vertical sealed portion forming section 3, the folded and overlapped both side edge parts of the packaging film F are continuously heated and pressed with a pair of vertical sealing rolls 3a in a longitudinal direction (vertical direction) of the packaging film F to form an easy separable sealed portion 4a and shape into a cylindrical form. Moreover, the formation of the easy separable sealed portion 4a can be changed properly, for example, by disposing at a constant width from the both side edge parts of the packaging film F, or disposing linearly in positions separated from both side edges, or disposing in vertical strips. As the first vertical sealed portion forming section 3 may be used a pair of heat sealing plates in addition to the pair of heat sealing rolls.

The easy separable sealed portion 4a can suppress the flowing out of the packing material from the bag, while it has a fusion strength of about 2-10 N/15 mm capable of separating simply by pushing to a filling space of the packing material in the bag. Such an easy separable sealed portion 4a can be formed by adjusting a temperature, pressure and the like in the pair of vertical sealing rolls 3a. However, since the pair of vertical sealing rolls made of a metal have been used in the past, a preferable temperature range is as narrow as 1-2° C., and the adjustment thereof is very difficult. In the invention, the surface of at least one of the pair of vertical sealing rolls 3a is made from an elastic material softer than a metal (hereinafter referred to as "elastic material" simply), so that a pushing pressure between the pair of vertical sealing rolls 3a can be made to an extremely low pressure (about 0-15 MPa). Therefore, the easy separable sealed portion 4a can be formed stable by adjusting the temperature of the vertical sealing roll 3a, clearance between the pair of vertical sealing rolls and so on to adjust an easy separable strength.

Each of the pair of vertical sealing rolls 3a is provided on its outer periphery with an annular flange and in its inside with a heater (not shown) for heating the annular flange. When the vertical sealing roll 3a is made from the elastic material, since the heat conductivity is small, the temperature difference between the inside and outer surface of the vertical sealing roll 3a becomes larger. To this end, the temperature of the heated in the vertical sealing roll 3a is preferable to be adjusted based on a measured value when the surface temperature of the vertical sealing roll 3a is measured by using a radiation thermometer, an infrared camera or the like. As the elastic material may be used a rubber material such as silicone rubber, fluororubber, ethylene-propylene rubber, Hypalon rubber, nitrile-butadiene rubber or the like, or any resins having an elasticity lower than the metal such as polytetrafluoroethylene, epoxy resin, phenolic resin, polyamide, polyester and the like. Moreover, the thickness is preferable to be 1.0-5.0 mm.

When at least one of the pair of vertical sealing rolls 3a is made from the metallic material, it is preferable to make a contact area with the packaging film F by subjecting the surface of the vertical sealing roll 3a made from the metallic material to polishing, blasting or piercing of about 0.2-0.8 mmφ, whereby the pushing force and heat conduction from the vertical sealing roll 3a is weakened to facilitate the adjustment of temperature, pushing force and so on in the formation of the easy separable sealed portion 4a.

In the second vertical sealed portion forming section 5, a vertical sealed portion 4b having a heat seal strength required as a package body (not less than 40 N/15 mm in case of 15 μm of nylon thickness/40 μm of linear low-density polyethylene thickness) is formed by continuously heating and pressing the previously formed easy separable sealed portion 4a with a pair of vertical sealing rolls 5a.

Figure 2A:
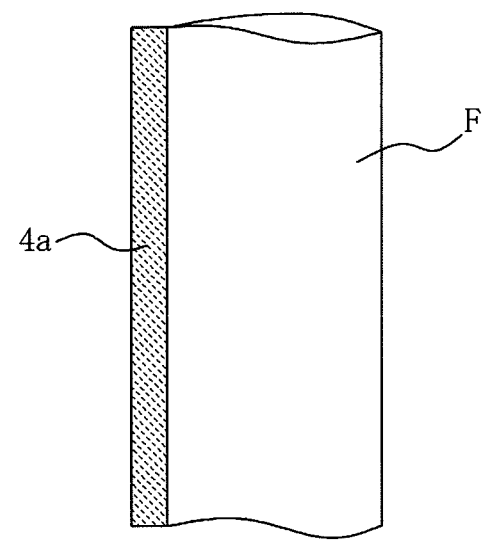
FIGS. 2(a) and 2(b) are explanatory diagrams of a method for forming a pouring pathway with an easy separable sealed portion in a vertical sealed portion.
Figure 2B:
Figure 2B:
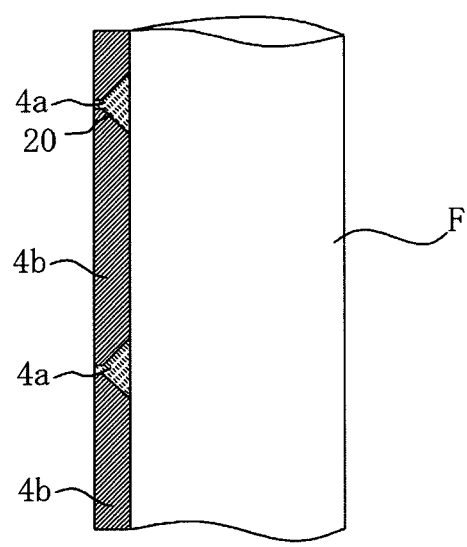

Moreover, bottle mouth type notches are formed in the surfaces of the pair of vertical sealing rolls 5a at constant intervals, whereby the vertical sealed portion 4b is not formed in the notch position, so that the vertical sealed portion 4b and a pouring pathway 20 having the easy separable sealed portion 4a of a bottle mouth type are formed alternately in the side edge part of the packaging film F as shown in FIG. 2(b). Moreover, the pouring pathway 20 of a bottle mouth type has a form tapering toward the side edge of the packaging film F in FIG. 2(b), but is not limited thereto and may take, for example, an equal-width or inverse-tapering form.

Also, the second vertical sealed portion forming section 5 may be a pair of sealing plates instead of the pair of sealing rolls.

In the second vertical sealed portion forming section 5, a vertical sealed portion may be formed at a proper length by controlling a rotation of a driving motor based on production conditions input to a control means functioning as a main computer for the fill packaging machine such as running speed of the packaging film F, revolution number of the first vertical sealed portion forming section 3, length of the heat sealing bar, product pitch and so on.

In this embodiment, two guide rods (lower side) 18 are inserted into the cylindrically formed packaging film F from the folded portion 2 of the film, and the packaging film F is widened by these guide rods (lower side) 18 in a direction perpendicular to the running direction thereof to position the vertical sealed portion 4b into a central part (back-lining joint position), and a packing material is filled into the interior of the cylindrically formed packaging film F from a packing material supply section 6 continuously or intermittently at a given amount.

Further, the vertical sealed portion 4b positioned as the back-lining joint part is tipped toward one side and the packaging film F is fused at given intervals in the longitudinal direction thereof by heating and pressing at such a state over the full width with a pair of lateral sealing rolls 7a in a first lateral sealed portion forming section 7 to form lateral sealed portions 8 intermittently. Thereafter, lateral sealing is ensured by re-pushing the lateral sealed portion 8 with a pair of lateral sealing rolls 9a in a second lateral sealed portion forming section 9, whereby many package bags W are continuously manufactured at a connected state in the longitudinal direction of the packaging film F. Moreover, it is preferable that a heating temperature by the lateral sealing roll 7a in the first lateral sealed portion forming section 7 is made higher than a heating temperature by the lateral sealing roll 9a in the second lateral sealed portion forming section 9. Then, individual package bags W are obtained by cutting approximately middle parts of the lateral sealed portions 8 in the continuously formed package bags W in a cut section 10. In each of the first lateral sealed portion forming section 7 and the second lateral sealed portion forming section 9 may be used a pair of lateral sealing plates instead of the pair of lateral sealing rolls.

Figure 3A:
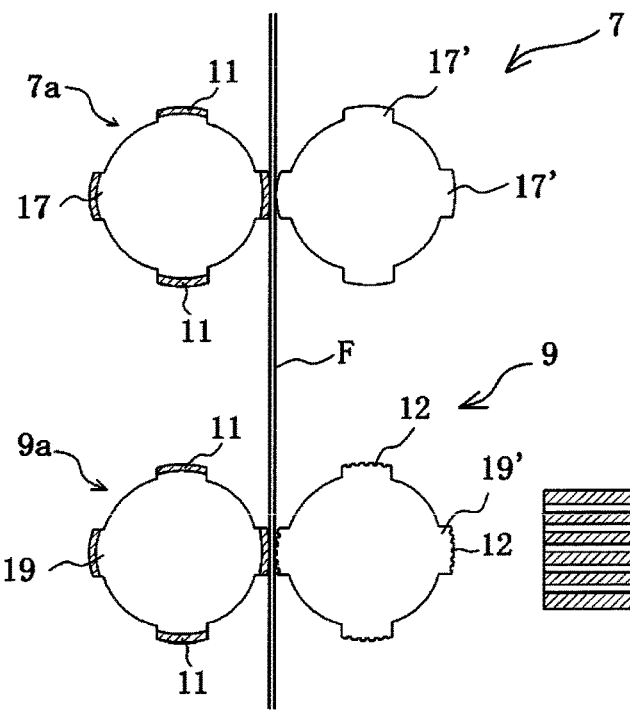
FIG. 3(a) is a view illustrating a construction of heat sealing rolls in first lateral sealed portion forming section and second lateral sealed portion forming section and FIG. 3(b) is a view illustrating a surface form of a heat sealing roll made from a metallic material in second lateral sealed portion forming section.

At least one of the lateral sealing rolls 7a or 9a in the above pair is preferable to be provided with plural sealing bars 17 or 19 protruding from the outer peripheral surface of the lateral sealing roll at a side of the vertical sealed portion 4b at least corresponding to the back-lining joint part in which the surfaces thereof are made from an elastic material. In FIG. 3(a) is shown a case that each surface of the plural sealing bars 17, 19 (4 bars in the FIGURE) located at a side of the back-lining joint part in the pair of lateral sealing rolls 7a, 9a is made from an elastic material 11, while each of plural sealing bars 17', 19' corresponding to the other side (4 bars in the FIGURE) is made from a metallic material. Thus, when lateral sealed portions 8 corresponding to upper end part and lower end part of the package bag are formed in the cylindrically formed packaging film F at a state of tipping the vertical sealed portion 4b as a back-lining joint part toward one side, the vertical sealed portion 4b formed by overlapping four packaging films F (back-lining joint part) is embedded into the surface of the heat sealing roll or heat sealing plate made from the elastic material to mitigate the difference of thickness in the packaging film F to the other portion, whereby the lateral sealed portions 8 can be formed uniformly and strongly without increasing the pushing force. As the elastic material 11 may be included a rubber material such as silicone rubber, fluororubber, ethylene-propylene rubber, Hypalon rubber, nitrile-butadiene rubber or the like, or any resins having an elasticity lower than the metal such as polytetrafluoroethylene, epoxy resin, phenolic resin, polyamide, polyester and the like. Also, the thickness is preferable to be 1.0-5.0 mm.

Figure 3B:
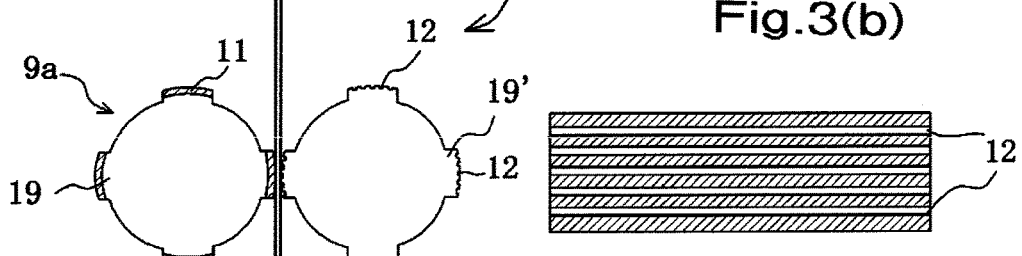

As shown in FIG. 3(b) in an enlarged scale, it is preferable that the surface of the sealing bar 19' made from the metallic material in the lateral sealing roll 9a of the second lateral sealed portion forming section 9 is subjected to grooving 12 in a direction perpendicular to the running direction of the packaging film F. Thus, the packing material and bubbles bitten into the lateral sealed portion 8 can be pushed out by the rise of face pressure in the sealing bar 19', while the upper and lower end parts of the lateral sealed portion 8 overlapped with the vertical sealed portion 4b can be fused rigidly with the increase of line pressure in the edge part of the sealing bar 19' in the lateral sealing roll 9a.

Figure 4:
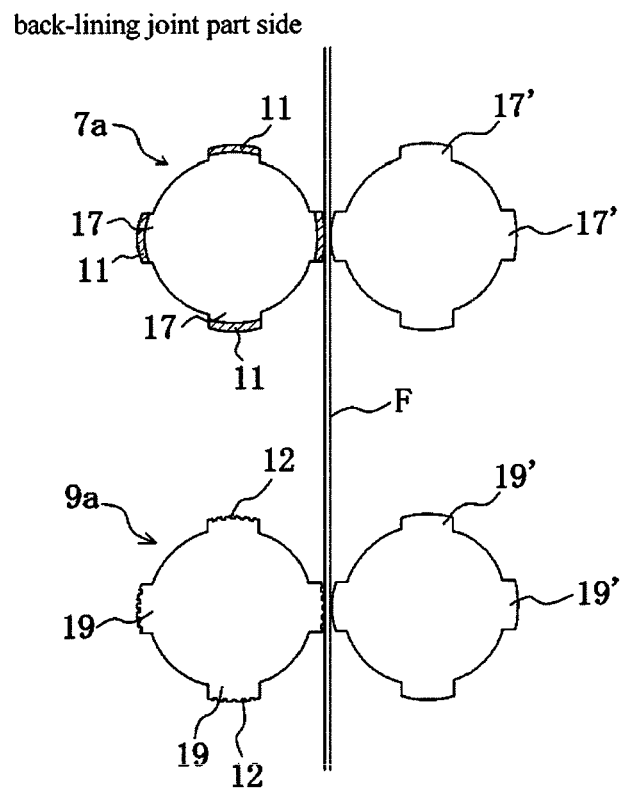
FIG. 4(a) is a view illustrating another construction of heat sealing rolls in first lateral sealed portion forming section and second lateral sealed portion forming section.
FIG. 4(b) is an enlarged sectional view of an elastic material part in first lateral sealed portion forming section.
Figure 4:
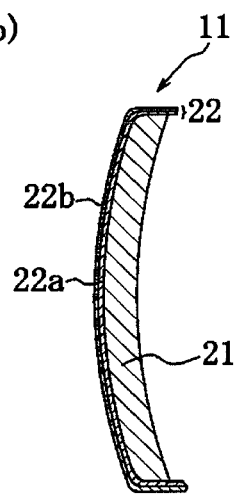

Another embodiment of the lateral sealing rolls 7a and 9a is shown in FIG. 4. In a pair of lateral sealing rolls 7a constituting a first lateral sealed portion forming section 7 of this embodiment, a surface of a sealing bar 17 corresponding to a side of a back-lining joint part is made from an elastic material 11 such as polytetrafluoroethylene or the like, while each of plural sealing bars 17' corresponding to the other side is made from a metallic material. On the other hand, sealing bars 19, 19' in a pair of lateral sealing rolls 9a constituting a second lateral sealed portion forming section 9 are made from a metallic material, respectively. Also, the surface of the sealing bar 19 in the lateral sealing roll 9a corresponding to a side of a back-lining joint part is subjected to grooving 12 in a direction perpendicular to the running direction of the packaging film F as shown in FIG. 3(b).

Thus, lateral sealed portions 8 can be formed uniformly and rigidly by the effect of the sealing bar 17 made from the elastic material in the pair of lateral sealing rolls 7a for the first lateral sealed portion forming section 7 likewise the above case. The lateral sealed portion 8 is further heated and pressed by a pair of lateral sealing rolls 9a made from a metallic material in a second lateral sealed portion forming section 9 while pushing out the packing material included in the lateral sealed portion 8, whereby the sealing strength can be more increased.

Moreover, the elastic material 11 on the surface of the sealing bar 17 of the lateral sealing roll 7a can be a lamination structure of a base material 21 and a coating material 22 for coating the base material 21 as shown in FIG. 4(b) in an enlarged scale. Also, the coating material 22 may be a lamination structure (two layers in the FIGURE: 22a, 22b) as shown in FIG. 4(b). In this case, for example, PET layer or the like as the coating material 22a is laminated on the base material 21 made from an elastic material such as trifluoroethylene or the like for suppressing the deformation, wearing or the like of the base material 21 and a fluorine-impregnating layer or the like is laminated as the coating material 22b of an outermost layer for not only suppressing the wearing, breaking or the like of the packaging film sandwiched but also preventing the adhesion of the packaging film to the sealing bar 17. That is, it is preferable to properly select the coating material 22 in accordance with the various conditions such as kind of the base material 21, kind of the packaging film and so on. Thus, various base materials 21 can be used, while the heat sealing roll or heat sealing plate can be used over a long period of time. Moreover, the elastic material 11 used in the vertical sealing roll 3a may be a lamination structure of base material 21 and coating material 22, whereby the action and effect similar to the above case can be expected.

Figure 5:
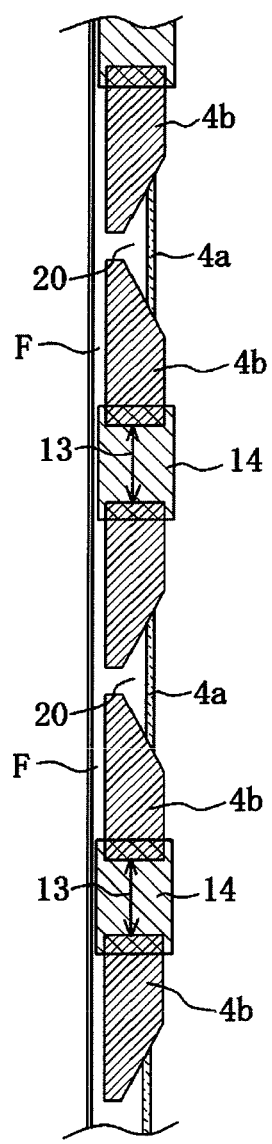
FIG. 5 is a schematic view illustrating a state of forming a vertical sealed portion with third lateral sealed portion forming section.

In the invention, it is preferable to dispose the third vertical sealed portion forming section in a position backward the second vertical sealed portion forming section 5. In this case, a heat sealing bar having a notch of a bottle mouth type is arranged on the surface of the vertical sealing roll 5a in the second vertical sealed portion forming section 5 and functions as a sealing means for forming a vertical sealed portion 4b provided with a pouring pathway 20 of a bottle mouth type at a constant interval as shown in FIG. 5, while the third vertical sealed portion forming section functions as a sealing means for forming a connecting sealed portion 14 by heat sealing a gap 13 produced between the vertical sealed portions 4b to connect the vertical sealed portions 4b to each other.

In this case, various products can be manufactured at a different product pitch with the same apparatus by properly changing the length of the heat sealed portion in the third vertical sealed portion forming section without requiring the replacement of the apparatus in accordance with the longitudinal length of the product to be manufactured (product pitch).

In the third vertical sealed portion forming section, the vertical sealed portions can be formed in a proper length by controlling rotation of a driving motor based on a running speed of the packaging film F input to a control means acting as a main computer of the fill packaging machine and production conditions such as a revolution number of the second vertical sealed portion forming section 5, a length of the heat sealing bar, a product pitch and so on.

EXAMPLE

A pouring pathway 20 having an easy separable sealed portion 4a is formed on a back-lining joint part made of a vertical sealed portion 4b of a package bag W with first heat sealing rolls (a combination of a metallic heat sealing roll and a heat sealing roll having a surface of silicone rubber) and a second heat sealing rolls (a pair of metallic heat sealing rolls) under the following conditions.

Moreover, each of the package bags W has a width of 54 mm and a bag pitch of 50 mm (upper and lower lateral sealed portions: 6 mm×2, inner size: 38 mm), and 5 g of water is filled thereinto as a packing material.

Figure 6:
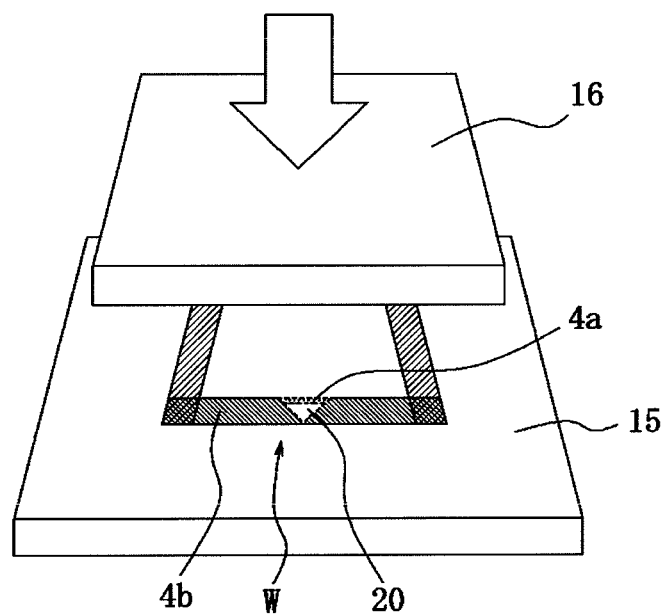
FIG. 6 is a diagram illustrating a test state of measuring an opening strength of an easy separable sealed portion.

With respect to the each package bag W, an opening strength is measured by mounting the bag onto a flat bottom plate 15 while folding into two parts centering on the back-lining joint part (vertical sealed portion 4b) and pushing with a flat top plate 16 till the separation of the easy separable sealed portion 4a in the pouring pathway 20 as shown in FIG. 6. The results are shown in Tables 1 and 2. Moreover, the evaluation standard is as follows.

X: occurrence of liquid leakage

Δ: less than 2.0 kgf

◯: not less than 2.0 kgf but less than 5.0 kgf

▲: not less than 5.0 kgf (Condition 1)

Packaging film: NY 15 μm/LLDPE 40 μm

Silicone rubber: 12 m/min

Distance between first heat sealing rolls: no adjustment (Condition 2)

Packaging film: NY 15 μm/LLDPE 40 μm

Silicone rubber: thickness 3 mm, hardness 90 degree

Filling speed: 12 m/min

Setting temperature: 95° C.

Distance between first heat sealing rolls: adjusted

Sealing width: 2.4 mm, 1.0 mm, 0.5 mm

Pushing force of first heat sealing roll: adjusted

In the above case, minus value of the distance between rolls means a state that the metal roll is bitten into the rubber roll.

TABLE 1

| Condition 1 | |
|---|---|
| Setting temperature (° C.) | Opening strength |
| 83 | X |
| 85 | Δ |
| 87 | ◯ |
| 89 | ◯ |
| 91 | ◯ |
| 93 | ◯ |
| 95 | ◯ |
| 97 | ◯ |
| 99 | ◯ |
| 101 | ◯ |
| 103 | ◯ |
| 105 | ▲ |

TABLE 2

| Condition 2 | | | | |
|---|---|---|---|---|
| Distance between rolls (mm) | Sealing width (mm) | Piercing of metal roll (mmφ) | Pushing force (MPa) | Opening strength |
| 0.1 | 2.4 | 0.5 | — | X |
| 0 | 2.4 | 0.5 | — | X |
| −0.2 | 2.4 | 0.5 | 0.2 | Δ |
| −0.4 | 2.4 | 0.5 | 0.4 | ◯ |
| −0.6 | 2.4 | 0.5 | 0.7 | ◯ |
| −0.8 | 2.4 | 0.5 | 1.0 | ◯ |
| not adjusted | 2.4 | 0.5 | 2.5 | ◯ |
| 0.1 | 1.0 | none | — | X |
| 0 | 1.0 | none | — | X |
| −0.2 | 1.0 | none | 0.3 | X |
| −0.4 | 1.0 | none | 0.6 | Δ |
| −0.6 | 1.0 | none | 1.0 | ◯ |
| −0.8 | 1.0 | none | 1.8 | ◯ |
| not adjusted | 1.0 | none | 6.0 | ◯ |
| 0.1 | 0.5 | none | — | X |
| 0 | 0.5 | none | — | X |
| −0.2 | 0.5 | none | 0.5 | Δ |
| −0.4 | 0.5 | none | 1.1 | ◯ |
| −0.6 | 0.5 | none | 2.5 | ◯ |
| −0.8 | 0.5 | none | 4.8 | ◯ |
| not adjusted | 0.5 | none | 15.0 | ◯ |

According to the fill packaging machine of the above embodiment, as seen from the results of Table 1, the temperature range capable of forming the easy separable sealed portion 4 is wider, and the easy separable sealed portion can be stably formed by adjusting the heat sealing temperature. As seen from the results of Table 2, the easy separable sealed portion can be formed at a low pushing force by adjusting clearance between rolls, while the easy separable sealed portion can be also formed by increasing the pushing force without adjusting the clearance between rolls.

DESCRIPTION OF REFERENCE SYMBOLS

1 film guiding section, 2 film folded portion, 3 first vertical sealed portion forming section, 3a vertical sealing roll, 4a easy separable sealed portion, 4b vertical sealed portion, 5 second vertical sealed portion forming section, 5a vertical sealing roll, 6 packing material feeding section, 7 first lateral sealed portion forming section, 7a lateral sealing roll, 8 lateral sealed portion, 9 second lateral sealed portion forming section, 9a lateral sealing roll, 10 cutting section, 11 elastic material, 12 surface of lateral sealing roll, 13 gap, 14 connecting sealed portion, 15 bottom portion, 16 top portion, 17, 17' sealing bar, 18 guide rod, 19, 19' sealing bar, 20 pouring pathway, 21 base material, 22, 22a, 22b coating material, F packaging film, W package bag

The invention claimed is:

1. A fill packaging machine for manufacturing a package body, comprising:
   a vertical sealer for folding a packaging film run out from an original fabric roll at its central part so as to face adhesive layers or sealant layers to each other and continuously forming a vertical sealed portion at its side edge part in a longitudinal direction of the packaging film to shape into a cylinder, and
   a lateral sealer for forming lateral sealed portions, each of which being extended over a full width of the packaging film in a direction perpendicular to the longitudinal direction of the packaging film, at given intervals in the longitudinal direction of the packaging film while filling a liquid packing material into the cylindrically formed packaging film;

the vertical sealer is provided with a first vertical sealer and a second vertical sealer, and an easy separable sealed portion is continuously formed in the side edge part of the packaging film by the first vertical sealer, and thereafter a partial non-sealed portion is formed on the easy separable sealed portion on the same side edge part of the packaging film by the second vertical sealer, and the first vertical sealer is provided with a pair of heat sealing rolls, a surface of at least one of which is made from an elastic material softer than a metal, and capable of forming the easy separable sealed portion having a fusion strength of 2-10 N/15 mm separable by pushing a filling space of a packing material in the package body.

2. The fill packaging machine according to claim 1, wherein the first vertical sealer is a pair of heat sealing rolls, one of which is made from an elastic material softer than a metal and the other is made from a metallic material, a surface of the heat sealing roll made from the metallic material is subjected to polishing, blasting or piercing.

3. The fill packaging machine according to claim 1, wherein the second vertical sealer is made of a pair of heat sealing rolls provided with heat sealing bars and a third vertical sealer for heat sealing a portion between the sealed portions formed by the second vertical sealer is located posterior to the second vertical sealer.

4. The fill packaging machine according to claim 1, wherein the vertical sealer is a joint part, while the lateral sealer is provided with a first lateral sealer and a second lateral sealer, and at least one of the first lateral sealer and the second lateral sealer is a pair of heat sealing rolls, a surface of which at least facing to the joint part is made from an elastic material softer than a metal.

5. The fill packaging machine according to claim 4, wherein at least one of the first lateral sealer and the second lateral sealer is a pair of heat sealing rolls, one of which is made from an elastic material softer than a metal and the other is made from a metallic material, a surface of the heat sealing roll made from the metallic material is subjected to grooving extending in a direction perpendicular to the running direction of the packaging film.

6. The fill packaging machine according to claim 1, wherein the elastic material softer than the metal has a laminate structure of two or more layers.

7. A method of manufacturing a package body with a pouring pathway at an easy separable state on a vertical sealed portion with a fill packaging machine provided with a vertical sealer including a first vertical sealer and a second vertical sealer for folding a packaging film run out from an original fabric roll at its central part so as to face adhesive layers or sealant layers to each other and continuously forming a vertical sealed portion at its side edge part in a longitudinal direction of the packaging film to shape into a cylinder, the method comprising:

forming lateral sealed portions with a lateral sealer, each lateral sealed portion being extended over a full width of the packaging film in a direction perpendicular to the longitudinal direction of the packaging film, at given intervals in the longitudinal direction of the packaging film while filling a liquid packing material into the cylindrically formed packaging film;

continuously forming an easy separable sealed portion in the side edge part of the packaging film by the first vertical sealer, and thereafter forming a vertical sealed portion having a partial non-sealed portion on the easy separable sealed portion on the same side edge part of the packaging film by the second vertical sealer, wherein the first vertical sealer is provided with a pair of heat sealing rolls, a surface of at least one of which is made from an elastic material softer than a metal, and capable of forming the easy separable sealed portion having a fusion strength of 2-10 N/15 mm separable by pushing a filling space of a packing material in the package body.

8. The method of manufacturing a package body with a pouring pathway at an easy separable state on a vertical sealed portion according to claim 7, wherein the first vertical sealer is a pair of heat sealing rolls, one of which is made from an elastic material softer than a metal and the other is made from a metallic material, a surface of the heat sealing roll made from the metallic material is subjected to polishing, blasting or piercing.

9. The method of manufacturing a package body with a pouring pathway at an easy separable state on a vertical sealed portion according to claim 7, wherein the second vertical sealer is made of a pair of heat sealing rolls provided with heat sealing bars and a third vertical sealer for heat sealing a portion between the sealed portions formed by the second vertical sealer is located posterior to the second vertical sealer.

10. The method of manufacturing a package body with a pouring pathway at an easy separable state on a vertical sealed portion according to claim 7, wherein the vertical sealer is a joint part, while the lateral sealer is provided with a first lateral sealer and a second lateral sealer, and at least one of the first lateral sealer and the second lateral sealer is a pair of heat sealing rolls, a surface of which at least facing to the joint part is made from an elastic material softer than a metal.

11. The method of manufacturing a package body with a pouring pathway at an easy separable state on a vertical sealed portion according to claim 10, wherein at least one of the first lateral sealer and the second lateral sealer is a pair of heat sealing rolls, one of which is made from an elastic material softer than a metal and the other is made from a metallic material, a surface of the heat sealing roll made from the metallic material is subjected to grooving extending in a direction perpendicular to the running direction of the packaging film.

12. The method of manufacturing a package body with a pouring pathway at an easy separable state on a vertical sealed portion according to claim 7, wherein the elastic material softer than the metal has a laminate structure of two or more layers.

* * * * *